Sept. 3, 1940.　　　G. W. ASHLOCK, JR　　　2,213,893
FRUIT STRAIGHTENING DEVICE
Filed March 21, 1940　　　2 Sheets-Sheet 1
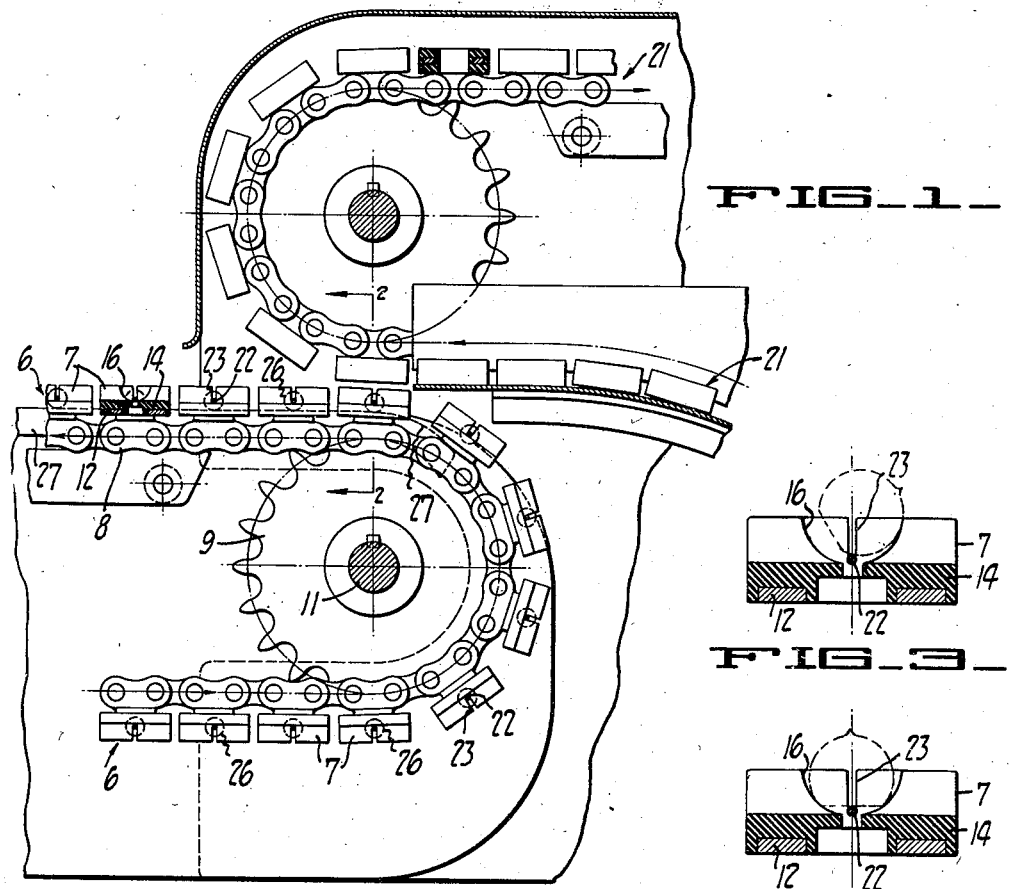
FIG_1_
FIG_3_
FIG_4_
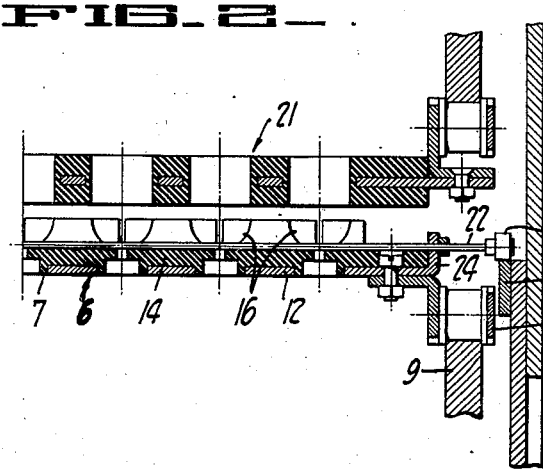
FIG_2_
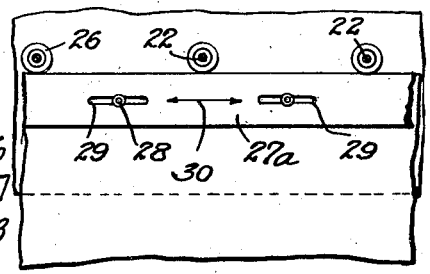
FIG_2A_
INVENTOR
George W. Ashlock Jr.
BY
Robert H. Eckhoff
ATTORNEY Sept. 3, 1940.    G. W. ASHLOCK, JR    2,213,893
FRUIT STRAIGHTENING DEVICE
Filed March 21, 1940    2 Sheets-Sheet 2
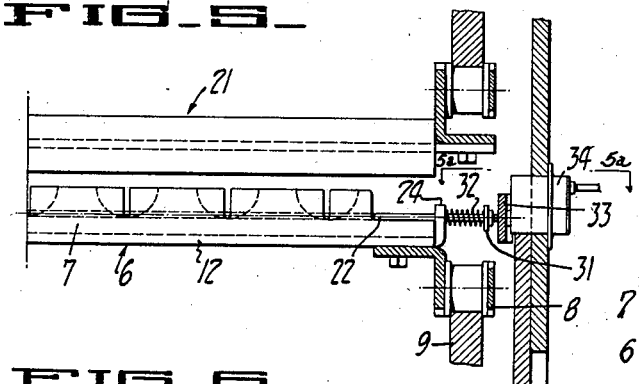
FIG_5_
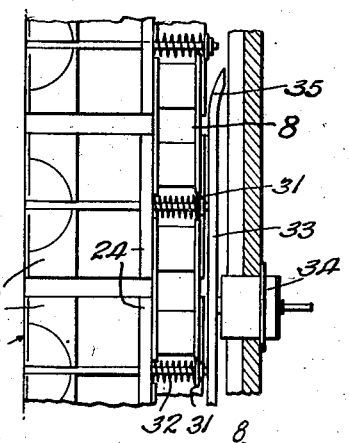
FIG_5A_
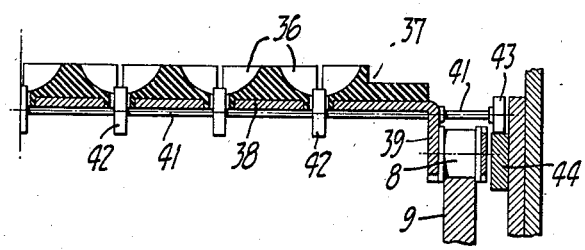
FIG_6_
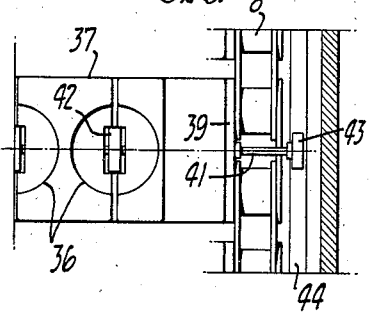
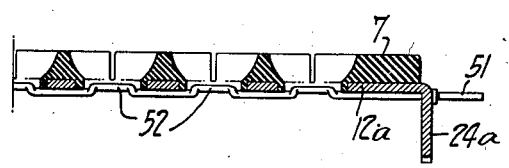
FIG_8_
FIG_7_
FIG_6A_
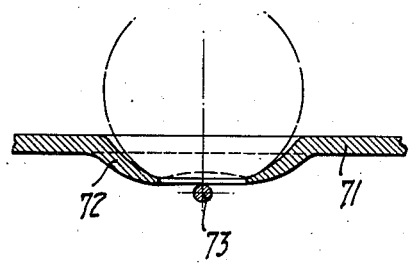
FIG_10_
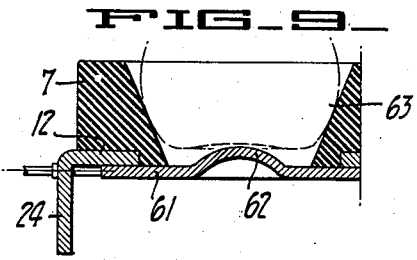
FIG_9_
FIG_7A_
INVENTOR
George W. Ashlock Jr.
BY Robert H. Eckhoff
ATTORNEY Patented Sept. 3, 1940

2,213,893

UNITED STATES PATENT OFFICE 2,213,893

FRUIT STRAIGHTENING DEVICE

George W. Ashlock, Jr., Oakland, Calif.

Application March 21, 1940, Serial No. 325,244

12 Claims. (Cl. 198—33)

This invention relates to fruit straightening devices and, more particularly, to the centering of fruit.

In the Goranson et al. Patent Number 1,742,653, of January 7, 1930, there is disclosed a machine for pitting fruit, particularly one enabling fruit, such as cherries, to be positioned with the depression or "dimple" in the fruit accurately centered in an opening in a fruit holder prior to operation of a pitting knife. This invention is concerned with such machines, and, more particularly, with an improved machine having a very high capacity.

Goranson employs a rotating or vibrating finger which operates through the holder opening to rotate the fruit into position, the holder being intermittently advanced over a path. With a heavy fruit such as a peach, the finger must be rotated or vibrated at such a high rate that damage and bruising of the fruit frequently results. The disadvantage of this should be obvious.

With different grades of fruit, for example, different grades of cherries, the machine must be very accurately adjusted to each grade to secure the proper centering action. This results in delay. Further it does not permit mixed sizes to be handled together.

The machine of the present invention operates satisfactorily to center fruit practically independently of the weight thereof so that the dimple or depression is on the bottom. It is useful in the centering of cherries, peaches, plums, apricots, as well as vegetables such as tomatoes. It is also useful on beets if the stem end is properly cut off close to the beet to provide a flat surface. These objects are generally spherical with at least one face thereof capable of resting stably on a flat surface. The present invention enables any article having such a face to be moved until it is positioned with the said face in a horizontal position.

The general object of this invention is to provide a simple means for centering fruit with accuracy and rapidity of action to the end that the fruit holder presents the fruit or other article properly centered in the holder.

In the drawing accompanying and forming a part hereof, I have disclosed several embodiments of the invention, as described in the following specification.

Figure 1 is a side elevation in cross section through a machine of the present invention.

Figure 2 is a section taken along the line 2—2 of Figure 1 showing certain details of construction of the device.

Figure 2a is a sectional view illustrating a modified construction wherein a portion of the mechanism of Figure 2 is reciprocated.

Figures 3 and 4 are diagrammatic representations of steps in the straightening operation.

Figure 5 is a side elevation partly in section showing a modified construction.

Figure 5a is a section taken along the line 5a—5a of Figure 5.

Figure 6 is a side elevation partly in section showing a modified construction.

Figure 6a is a side view of a modification of a fruit engaging element.

Figure 7 is a partial plan view of the structure shown in Figure 6.

Figure 7a is a side view of another modification of a fruit engaging element.

Figure 8 is a side elevation partly in section showing a modified construction.

Figures 9 and 10 are side elevations partly in section showing other modifications.

As appears in Figure 1, I provide a fruit receiving conveyor indicated generally at 6. This conveyor is suitably made up after the manner of conveyor 10 as disclosed in my United States Patent Number 2,157,518, of May 9, 1939. As appears in said patent, a plurality of fruit holders, identified herein as 7 are positioned between oppositely provided conveyor chains 8 extending over sprockets 9 on shaft 11. Each fruit holder is made up of a metal strip 12 having integrally bonded thereto suitably apertured rubber facing sheet 14. This sheet is formed to provide one or more hemispherical depressions 16 therein which I term cup-like receptacles. The carrier or fruit holder illustrated is more fully disclosed in my application Serial Number 260,968, filed March 10, 1939. Its construction, so far as this invention is concerned, is immaterial and any form of conveyor can be used subject to certain presently described requirements.

The conveyor 6 usually moves horizontally as appears in Figure 1, as the conveyor advances the articles toward a suitable working or fruit handling mechanism for performing a cutting, peeling, trimming, pitting, stoning, halving, quartering, or other suitable operation. The conveyor 6 is suitably fed with articles to be handled. I have conveniently provided a second conveyor indicated generally at 21 carrying articles toward conveyor 6, and depositing them on conveyor 6 as is disclosed in my Patent Number 2,190,970, of February 20, 1940. Conveyor 6 can be fed, however, in any suitable manner.

In accordance with this invention, means are provided for turning the fruit in the fruit holder to position the fruit with the dimple or depression therein in a down position as in Figure 4, wherein that surface on the fruit which is capable of stably supporting the fruit on a flat surface is horizontally positioned. In accordance with this invention I provide an elongated rod member indicated generally at 22 and extending transversely to the direction of advance of the holders. Each holder is suitably formed to permit the rod 22 to be inserted in place and, when inserted, to function properly; in the embodiment of the invention shown in Figures 1–4, I have employed a slot 23 extending from the top of the carrier. Each rod is supported by ears 24 at each end of plate 12. The rods 22 can be vibrated, oscillated or rotated.

In that embodiment of the invention shown in Figures 1 and 2 each rod has a roller 26 at each end thereof which engages a track 27 on opposite sides of the machine to rotate the rod rapidly and thus position the fruit carried in the holders. If desired the track 27 can be reciprocated as by mounting track 27a on stationary pin 28 (Figure 2a) extending through slot 29 on the track. A suitable reciprocating means (not shown) serves to move the track back and forth as indicated by arrow 30.

The rod members are preferably made of wire, but they may be made of other suitable materials such as wood. Furthermore, the members may be rounded or of any other suitable cross-section. The essential thing to operation is the relative movement between the rod and the fruit holder to impart rotation of the fruit until the fruit comes to rest with the dimple side downwardly, in which position it rests stably upon the rod or slightly out of engagement with the rod, being stably supported by the fruit holder. The fruit is rotated or moved by the rod when it is supported by the holder and rod as appears in Figure 3 until it comes to rest in the position shown in Figure 4.

In Figure 5 I have shown a modification wherein each rod 22 carries a collar 31 adjacent one end thereof; a spring 32 is positioned between the collar and the adjacent ear 24 through which the rod extends to engage a curved plate 33 mounted upon a suitable vibrator structure 34. The plate is curved as at 35 so that each rod, as it is advanced by the conveyor, engages the plate and is held by the spring against the plate as the plate is vibrated. The vibrator is effective to move the rod longitudinally with respect to the fruit holder, thus imparting the required relative movement between the rod and the holder whereby fruit supported on the rod and on the holder is moved until it comes to rest with its dimple downwardly in which position it is stably supported by the fruit holder.

In Figures 6 and 7 I have shown another modification of the device in which the cup-like receptacle 36 in the fruit holder 37 is shallow in extent and rather large, this device being particularly adapted for use with large, heavy fruit such as peaches and the like. The fruit holder includes a plate structure 38 on the base thereof, this plate having downwardly turned the ears 39 at each end thereof to support a rod 41 for rotation. The bottom of each cup-like receptacle 36 is apertured to receive a wheel 42 mounted upon the rod 41 for movement therewith. Each rod carries a roller 43 at an end thereof which engages a suitable track 44 to rotate or oscillate the rod and its wheel rapidly. The relation of the wheel and the associated cup-like receptacle is such that the fruit is moved by the wheel until it comes to rest in a position in which it is supported by the cup-like receptacle so that even though the wheel still be rotated, the fruit remains stably positioned in the fruit carrier. The wheel can be provided with a smooth surface, as in Figs. 6 and 7, or a roughened, corrugated surface, as in Figure 6a. In addition, the periphery of the wheel can be made of some material having a relatively high coefficient of friction with the surface of the fruit or other article, such as rubber or the like, as shown in Fig. 7a. The wheel need not operate at high speed. Therefore, it does not result in tearing, bruising, or other injury to the fruit.

In Figure 8 I have shown another modification wherein rod 51 extends across the carrier 12a and is supported by opposite ears 24a. The rod includes a plurality of crank-like off-sets 52, each off-set extending into a receptacle to support and move an unstably supported article until it reaches a position of stable support. The rod may be rotated as in Figs. 1, 2, 6 and 7, vibrated as in Fig. 5 or oscillated by virtue of the modification shown in Fig. 2a, to provide the relative movement between it and the cup-like receptacle.

In Figure 9 is shown a further modification wherein is provided a plate 61 having an arcuate projection 62 thereon extending into the cup-like receptacle 63. The plate is supported below the carrier and is vibrated as it moves along with the carrier in a manner shown in Fig. 5. The arcuate projection engages unstably positioned fruit, rotating the fruit into a position of stable support.

In Figure 10 I have shown a further modification wherein a flat metal plate 71 is formed with a cuplike receptacle 72 permitting an unstably positioned article to depend therefrom to engage a cooperatively placed member 73. Member 73 is carried by the plate and is rotated as in Figs. 1, 2, 6 and 7, vibrated as in Fig. 5 or oscillated by virtue of the modification shown in Fig. 2a. The present application is a continuation-in-part of my earlier filed application Serial No. 284,864, filed July 17, 1929.

I claim:

1. A machine for positioning a generally spherical article having at least one face thereon capable of resting stably on a flat surface, said machine comprising a cup-like receptacle for supporting an article positioned therein, a member movably supported by said receptacle and extending across said receptacle adjacent the bottom thereof in a cooperative relation to said receptacle to engage an unstably supported article in said receptacle, means for moving said receptacle substantially continuously over a path, and means for moving said member relative to said receptacle during movement of said receptacle over said path.

2. A machine as in claim 1 wherein the member is rotated cooperatively adjacent the bottom of said receptacle.

3. A machine as in claim 1 wherein the member is a wheel rotated cooperatively adjacent the bottom of said receptacle.

4. A machine as in claim 1 wherein the member is a wheel rotated alternately in different directions and cooperatively adjacent the bottom of said receptacle.

5. A machine as in claim 1 wherein an elongated member is vibrated across said bottom opening.

6. A machine as in claim 1 wherein the member is vibrated across said bottom opening.

7. A machine for positioning a generally spherical article having at least one face thereon capable of resting stably on a flat surface, said machine comprising a cup-like receptacle for supporting an article positioned therein, means for moving said receptacle substantially continuously over a path, said receptacle having a slot therein extending transversely to the direction of motion of said receptacle and to adjacent the bottom of said receptacle, a member extending along said slot with a surface thereon adjacent the bottom of said receptacle, and means for moving said member in said slot.

8. A machine as in claim 7 wherein the member is rotated.

9. A machine as in claim 7 wherein the member is vibrated longitudinally in said slot.

10. A machine as in claim 7 wherein the member is rotated in said slot and the member carries a wheel.

11. A machine as in claim 7 wherein the slot extends from the top of said receptacle to adjacent the bottom of said receptacle substantially centrally of said receptacle.

12. A machine as in claim 7 wherein a single slot is centrally positioned with respect to the receptacle and a single elongated member is provided for cooperation with said slot during movement of said receptacle over said path portion.

GEORGE W. ASHLOCK, Jr.